Figure 1:
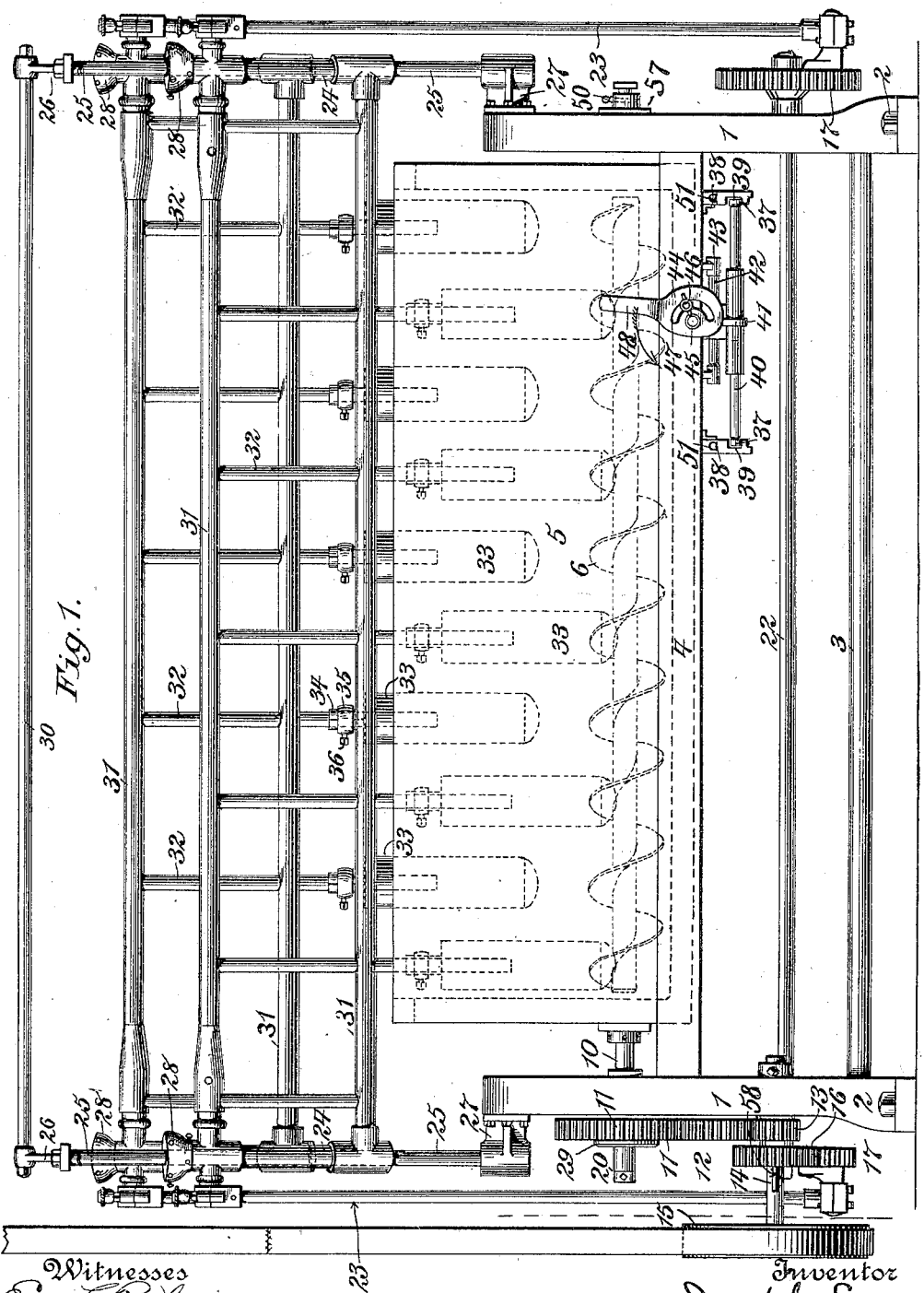

No. 696,575. Patented Apr. 1, 1902.
J. LEE.
MACHINE FOR MIXING AND KNEADING DOUGH OR ANALOGOUS MATERIALS.
(Application filed Sept. 4, 1901.)
(No Model.) 3 Sheets—Sheet 1.

Witnesses
Edward Rowland
M. F. Keating

Inventor
Joseph Lee
By his Attorney
Charles J. Kintner

No. 696,575. Patented Apr. 1, 1902.
J. LEE.
MACHINE FOR MIXING AND KNEADING DOUGH OR ANALOGOUS MATERIALS.
(Application filed Sept. 4, 1901.)
(No Model.) 3 Sheets—Sheet 2.
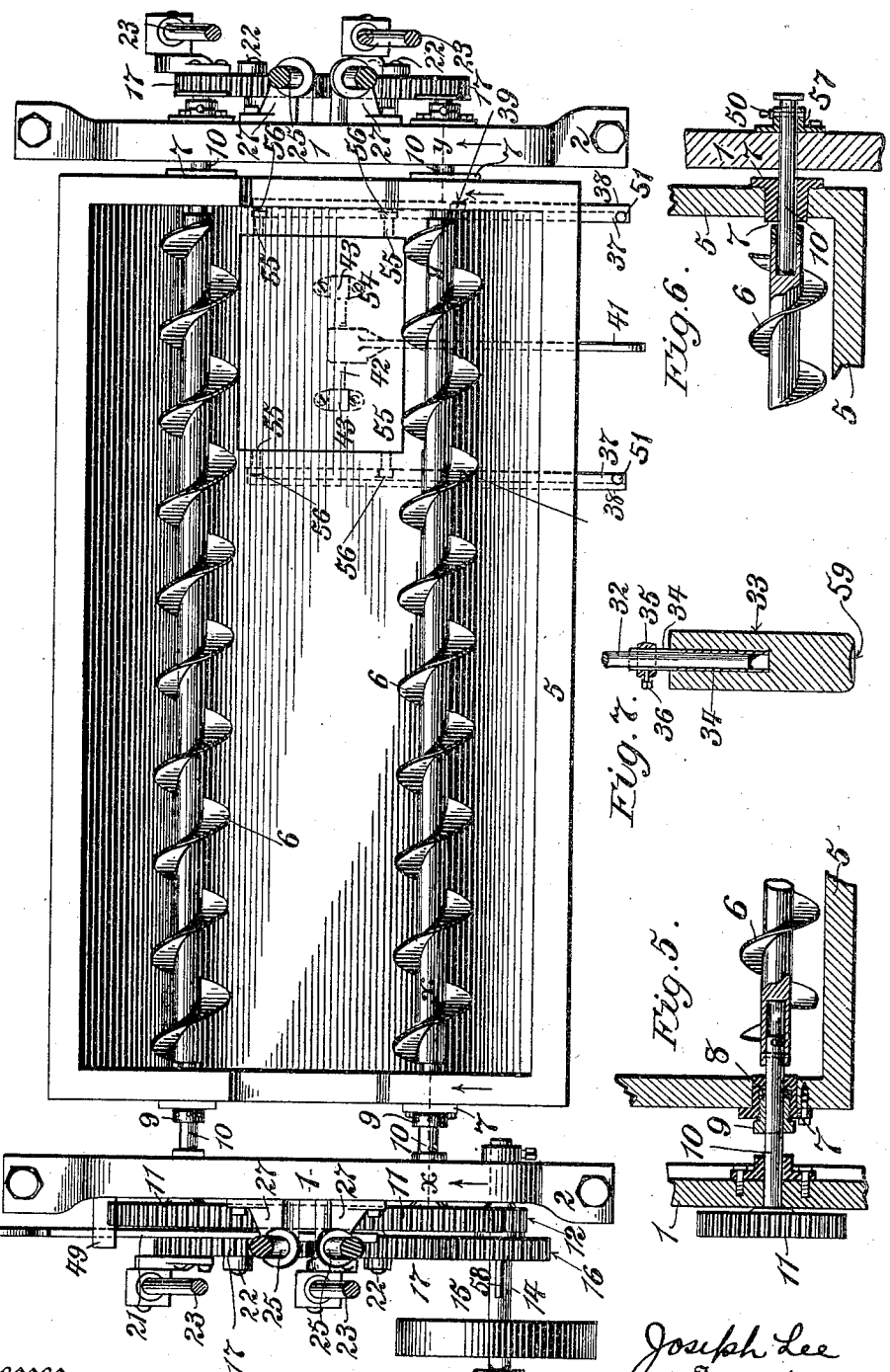
Witnesses
Edward Boyland
M. F. Keating
Joseph Lee
Inventor
By his Attorney
Charles J. Kintner No. 696,575. Patented Apr. 1, 1902.
J. LEE.
MACHINE FOR MIXING AND KNEADING DOUGH OR ANALOGOUS MATERIALS.
(Application filed Sept. 4, 1901.)
(No Model.) 3 Sheets—Sheet 3.
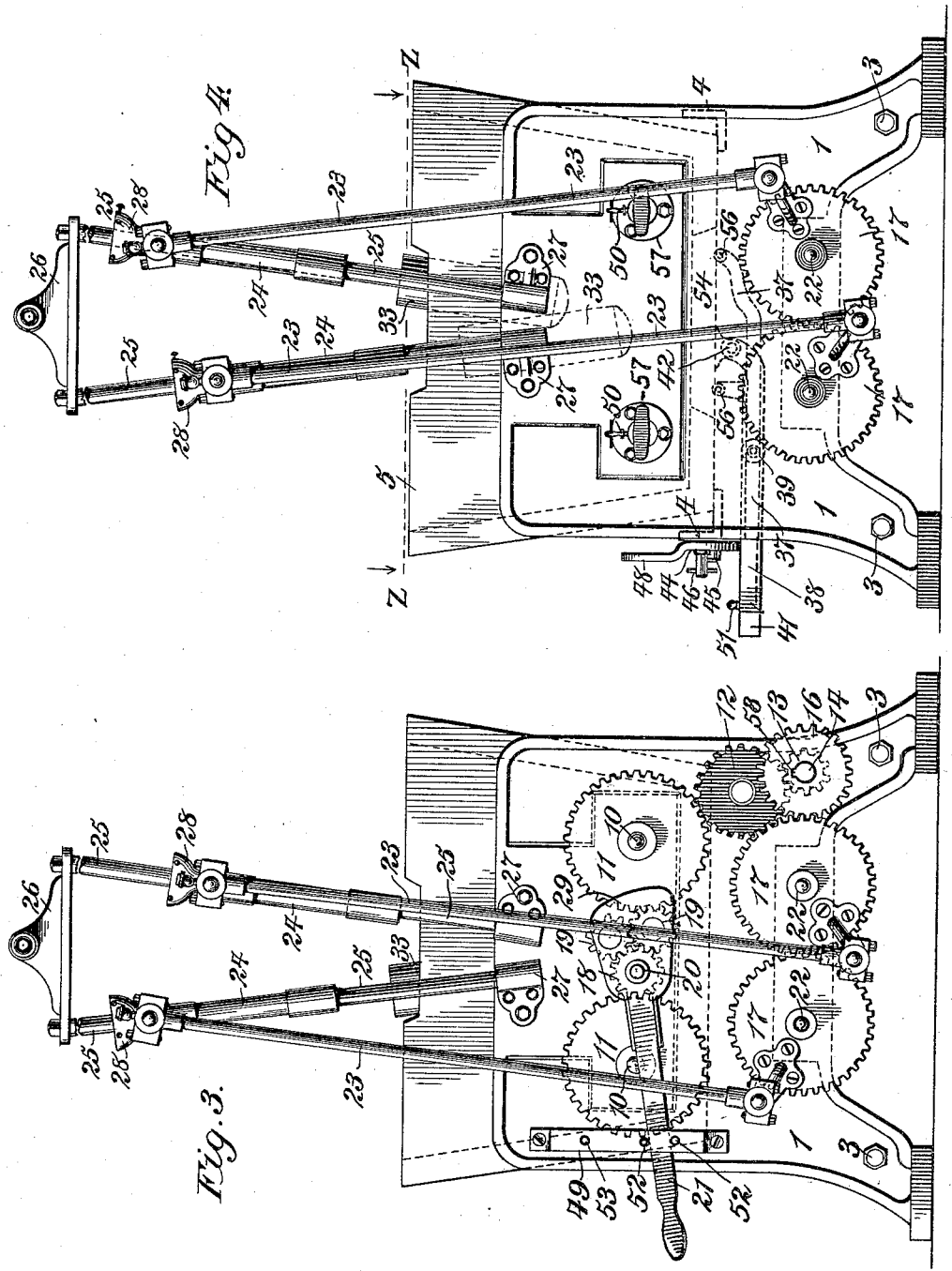
Witnesses
Edward Rowland
M. F. Keating
Inventor
Joseph Lee
By his Attorney
Charles J. Kintner

UNITED STATES PATENT OFFICE.

JOSEPH LEE, OF BOSTON, MASSACHUSETTS, ASSIGNOR, BY MESNE ASSIGNMENTS, TO NATIONAL BREAD COMPANY, OF NEW YORK, N. Y., A CORPORATION OF NEW JERSEY.

MACHINE FOR MIXING AND KNEADING DOUGH OR ANALOGOUS MATERIALS.

SPECIFICATION forming part of Letters Patent No. 696,575, dated April 1, 1902.

Application filed September 4, 1901. Serial No. 74,267. (No model.)

*To all whom it may concern:*

Be it known that I, JOSEPH LEE, a citizen of the United States, residing at Boston, county of Suffolk, and State of Massachusetts, have made a new and useful Invention in Machines for Mixing and Kneading Dough or Analogous Materials, of which the following is a specification.

This invention is directed to improvements upon a kneading-machine disclosed in a prior patent granted to me on the 7th day of August, 1894, numbered 524,042; and it has for its objects, first, to provide such a machine as will expeditiously and effectually mix and knead large quantities of dough in such manner that all of the material shall be successively subjected to the pounding action of two sets of reciprocating pestles so arranged as to alternately act upon the material; second, to so arrange the entire structure of the machine that the rotary mixing devices may be utilized solely as conveyers for the purpose of conveying the completed product out of the machine when required; third, to provide such a machine with a removable door beneath the lower surface thereof and so arranged that said door may be lowered and opened by moving it laterally and in such manner that any dough or analogous material which is being mixed or treated will be removed from the upper surface thereof; fourth, to arrange the details of the entire structure in such manner as to accomplish all of the results sought, as will be pointed out in the following specification, and particularly indicated in the claims at the end thereof.

Referring now to the drawings for a full and clear understanding of the invention, such as will enable others skilled in the art to construct and use the same, Figure 1 is a side elevational view of the complete machine, the reciprocating pestles at the ends of the reciprocating plungers and one of the rotary mixing devices or spiral conveyers being shown in dotted lines. Fig. 2 is a plan view of the entire machine as seen looking at Fig. 1 from the top toward the bottom of the drawing. Fig. 3 is an end elevational view as seen looking at Fig. 2 from left to right, the driving-pulley, however, not being disclosed in this view of the drawings. Fig. 4 is an end elevational view as seen looking at Fig. 2 from right to left; and Fig. 5 is a detail sectional view taken on the line $xx$, Fig. 2, and as seen looking thereat from the bottom toward the top of the drawing in the direction of the arrows, one end of one of the rotary mixing devices, the driving-shaft, and driving gear-wheel therefor being shown in elevational view. Fig. 6 is a similar detail sectional view taken on the line $yy$, Fig. 2, and as seen looking from the bottom toward the top of the drawing in the direction of the arrows, the other end of said rotary mixing device and its supporting-shaft being shown in elevational view. Fig. 7 is a detail sectional view of a modified form of one of the reciprocating pestles, showing also in elevational view the manner in which all of the pestles are attached to the reciprocating plungers.

Referring now to the drawings in detail, in all of which like numerals of reference represent like or equivalent parts wherever used, 1 1 represent the standards or supports of the machine, preferably of cast metal, secured together by horizontal tie-rods 3 3, near the lower ends thereof, and to the floor by bolts 2 2 2 2.

4 4 represent two angle-irons secured to the standards or supports at their opposite ends and acting in turn as a support for a mixing and kneading trough 5.

6 6 are rotary mixing devices or spiral conveyers located closely adjacent to the bottom and lower edges of the sides of the trough and detachably secured each at its opposite ends to shafting 10 10, (see Figs. 2, 5, and 6,) one part of the shafting being provided with a driving gear-wheel 11 and the other being stationary and detachably secured by a pin 50, extending through it, and a surrounding collar 57, secured directly to one of the standards or supports 1, said shafting in turn extending through a water-tight bearing 7, a corresponding water-tight bearing being provided at the other end for the rotary shafting 10, 8 being packing material and 9 a packing-ring of set-screw type so arranged as to prevent oil or other objectionable agents from entering the mixing and kneading trough from the journal-bearings. These two rotary mixing devices are each secured at one end to the rotary shafting 10 by a pin, as shown, the arrangement being such that when it is desired to remove either one of said devices it is only necessary to remove the pin 50, withdraw the stationary shaft 10, then remove the pin which connects the other end of the mixing devices with the rotary shafting 10 at that end, when it may be lifted out and cleaned or repaired, as required. The gear-wheels 11 11 intermesh, respectively, with reversing idlers 18 19 19, (see Fig. 3,) carried in a casing 29, and constitute a part of an operating-lever 21, pivoted upon a shaft 20, which supports the idler 18. These idlers 18 19 and lever 21 constitute a well-known form of reversing-gear, and the outer end of the lever is held in place by a guideway 49, secured at its opposite ends to the standard or support 1 and provided with pin-holes, as shown at 52 and 53, for inserting locking-pins, so as to hold the reversing-lever in either of two positions, the entire arrangement being such that one of the rotary mixing devices nearest to the outer end of the lever 21 may be caused to rotate in either direction, as desired. One of the gear-wheels 11 meshes with a gear-wheel 12, which in turn meshes with a driving-pinion 13 upon the main driving-shaft 14, which carries a driving-pulley 15, as clearly shown in Figs. 1 and 2 of the drawings. Upon the shaft 14 is a second driving gear-wheel 16, meshing with one of a pair of intermeshing gear-wheels 17 17 and carried by parallel lines of shafting 22 22, running beneath the machine and journaled in the standards or supports 1, an additional pair of intermeshing gear-wheels 17 17 being carried by the same shaft and located at the opposite end of the machine. This gear-wheel 16 is adapted to slide back and forth upon the shaft 14 and spline 58 for the purpose of disconnecting it from the gear-wheels 17 when desired.

23 23 are pitmen secured at their opposite ends, respectively, to cranks carried by the gear-wheels 17 17 at both ends of the machine and to reciprocating sleeves 24 24, adapted to reciprocate upon rods or standards 25 25, secured directly to the opposite ends of the machine by lugs or ears 27 27 and inclined outward at the top, their upper ends being secured by standards 26 26 and connected together by a cross-rod 30, as clearly shown in Fig. 1 of the drawings.

31 31 31 are horizontally-arranged rods and 32 32 32 corresponding sets of cross-rods secured thereto and constituting when united two reciprocating frames carried directly by the reciprocating sleeves 24, the ends of the rods 32 32 extending downward below the frames in each instance sufficiently far to act as reciprocating plungers or supports for adjustable and detachable pestles 33, made preferably of wood, bored out at their upper ends, so as to receive a sleeve 34, secured therein, said sleeve being split at its upper end, so as to enable it to surround the lower end of the rod 32 and be clamped thereto by a clamp 35 and set-screw 36, as clearly illustrated in detail in Fig. 7, such an arrangement making it possible to adjust the pestles to any desired point.

28 28 28 are oil-cups carried at the upper ends of the reciprocating sleeves 24 and adapted to supply oil for lubricating the sliding bearings between the rods or standards 25 25 and the reciprocating sleeves 24 24.

54 represents a rectangular-shaped door in the bottom of the trough 5 and near one end thereof, said door being provided with an operating-lever 41, pivotally secured to its under side by a horizontal cross-bar 42 and a pair of lugs or ears 43 43, the outer end of the operating-lever extending to a point easily accessible to an attendant.

55 55 55 are axles secured to the under side of the removable door 54 and provided at their outer ends with rollers 56 56 56 56, adapted to run in grooves 37 37 in a pair of guideways 38 38, secured beneath the bottom of the mixing and kneading trough, said grooves having the shape or configuration illustrated in Fig. 4 of the drawings, such that when the door is in its closed position, as therein shown, the several rollers 56 56 56 56 are in their upper positions at the extreme upper portion of the grooves 37.

40 is a rod secured directly to the operating-lever 41 and having at its opposite ends an additional pair of rollers 39 39, adapted to run also in the grooves 37 37, the arrangement being such that this rod 40 acts as a fulcrum about which the lever 41 turns when causing the door to be operated, as will be described in connection with the description of the mode of operation.

51 51 are pins extending downward through openings in the outer ends of the guideways 38 for preventing the complete withdrawal of the door, except when it is desired so to do.

44 is a locking-cam for the operating-lever 41, pivotally secured to one of the angle-irons 4 by a pin 45, said locking-cam being provided with an operating-lever 48 and a curved slot 47 for receiving a clamp or locking device 46, the arrangement being such that the cam may be locked or secured in any position, as desired.

The operation of the machine is as follows: The door 54 being closed and locked, as shown, the material to be mixed and kneaded is placed in the mixing and kneading trough 5, as desired. The reversing-lever 21 is put into the position illustrated in Fig. 3 of the drawings, in which position the arrangement is such that rotary motion is imparted to the rotary mixing devices or conveyers 6 6 in opposite directions, so as to cause the material to be advanced continuously forward and backward by the conveyers, thereby preventing the accumulation thereof at either end of the mixing and kneading trough. The machine is now set in motion through the agency of the belt and pulley 15, at which time the pinion 13 imparts rotary motion in opposite directions to the rotary mixing devices or spiral conveyers through the agency of the intermeshing gear-wheels 12 11 11 and properly intergeared idlers 18 19, thereby imparting to the material in the mixing and kneading trough movement continuously in opposite directions. At the same time motion is imparted through the gear-wheels 16 and intermeshing gear-wheels 17 17 17 17 at the opposite ends of the machine, interconnected rotary shafts 22 22, and pitmen 23 23 to the reciprocating sleeves 24 24, and hence to the attached reciprocating frames, to which are secured, as above indicated, the reciprocating pestles 33 33, so inclined toward each other by virtue of the angular location of the rods or standards 25 25 that when said reciprocating pestles successively reach the bottom of the trough they give to the material a successive pounding effect, thereby causing it to be forced outward through the under spiral portions of the mixing devices or conveyers. During their upward movement these conveyers continuously cause the material to be returned to the center of the machine for the successive action of the pestles. As this movement continues water, flour, lard, and the usual ingredients are added and the process carried on until the dough has assumed the desired condition, which will be obvious to any one skilled in the art. When this point is reached, the attendant through the agency of a lever (not shown) moves the gear-wheel 16 to the left (see Figs. 1 and 2) until it is out of mesh with the gear-wheel 17, thereby disconnecting the reciprocating frames. The attendant then so adjusts them relative to the upper surface of the dough that they are out of contact therewith. The reversing-lever 21 is then moved to its upper position in the guide-way 49 and a pin inserted in the hole 53, thereby reversing the order of the idlers 18 19 19. The attendant now places a receptacle beneath the door 54 for the dough, releasing the locking-clamp 46, and turns the locking-cam 44 in the direction indicated by the arrow, Fig. 1, in such manner as to release the outer or free end of the operating-lever 41. He then takes hold of this operating-lever, lifting it so as to cause the door to descend, at the same time pulling outward upon it, causing the rollers 56 56 beneath the bottom of the door and 39 39 at the end of the fulcrum-rod 40 to move laterally outward, so that the upper surface of the door is caused to move against the lower surface of the mixing and kneading trough until it assumes its extreme outward position, at the same time removing any dough which may have adhered to the upper surface thereof. The machine is now set in motion, and owing to the fact that one of the rotary mixing devices or conveyers is reversed in its direction of rotation both of these devices now become, in effect, actual conveyers, tending to move the dough toward the open door, continuing in this action until it is all moved to that end of the machine, passing out into the receptacle below.

In Fig. 7 of the drawings I have disclosed a modified form of pestle, in which the lower end thereof is hollowed out, as shown at 59, this for the purpose of causing the machine to more effectually force air into the dough as the pestles pass downward in their movement toward the bottom of the mixing and kneading trough.

Having thus described my invention, what I claim, and desire to secure by Letters Patent of the United States, is—

1. A mixing and kneading machine provided with one or more sets of reciprocating pestles operatively connected with a driving-shaft; in combination with two spiral conveyers operatively connected with the same shaft; together with means for changing the direction of rotation of one of the conveyers.

2. A mixing and kneading machine provided with one or more sets of reciprocating pestles operatively connected with a driving-shaft; in combination with two spiral conveyers operatively connected with the same shaft; together with means for changing the direction of rotation of one of the conveyers, and a door located at one end of the machine, whereby the conveyers are adapted to act in the first instance as mixing devices and in the second instance as means for conveying the completed product away from the machine.

3. A mixing and kneading machine provided with one or more sets of reciprocating pestles; together with a pair of rotary mixing devices or conveyers and interconnecting mechanism for both, operatively connected with a source of power; in combination with disconnecting mechanism for the reciprocating pestles and change-gear mechanism for one of the rotary mixing devices or conveyers, the arrangement being such that the pestles may be disconnected from the source of power and the direction of rotation of one of the mixing devices be reversed so as to cause the material to be moved toward one end of the machine.

4. A mixing and kneading machine provided with a removable door located in the bottom of the mixing and kneading trough; together with operating means so arranged that the door may be first lowered and then moved laterally beneath the bottom of the mixing and kneading trough.

5. A mixing and kneading machine provided with a removable door located in the bottom of the mixing and kneading trough and having mechanism for locking it in its upper or closed position; together with means for first lowering it and then moving it laterally to its complete open position.

6. A mixing and kneading machine consisting of a series of reciprocating pestles, a pair of rotary mixing devices or conveyers all operatively connected to a source of power and located within a mixing and kneading trough; together with a removable door located in the bottom of the trough and provided with means for first lowering it and then moving it laterally to its complete open position.

7. A mixing and kneading machine consisting of a series of reciprocating pestles and a pair of rotary spiral mixing devices or conveyers, all operatively connected to a source of power, and provided with means for disconnecting the reciprocating pestles from the source of power; and additional means for reversing the direction of movement of one of the conveyers; together with a removable door located beneath the bottom and at one end of the mixing and kneading trough and between the conveyers, said door being provided with means for lowering it and then moving it laterally to its complete open position, all of said parts acting substantially as and for the purpose described.

In testimony whereof I have signed my name to this specification in the presence of two subscribing witnesses.

JOSEPH LEE.

Witnesses:
C. J. KINTNER,
M. F. KEATING.